US008762275B2

(12) United States Patent
Martino et al.

(10) Patent No.: US 8,762,275 B2
(45) Date of Patent: Jun. 24, 2014

(54) SYSTEMS AND METHODS PROVIDING MULTIPLE ACCOUNT HOLDER FUNCTIONALITY

(75) Inventors: Matthew J Martino, Towson, MD (US); Richard J Jackman, Saint Johns, FL (US)

(73) Assignee: First Data Corporation, Greenwood Village, CO (US)

( * ) Notice: Subject to any disclaimer, the term of this patent is extended or adjusted under 35 U.S.C. 154(b) by 246 days.

(21) Appl. No.: 12/424,089

(22) Filed: Apr. 15, 2009

(65) Prior Publication Data

US 2010/0268645 A1 Oct. 21, 2010

(51) Int. Cl.
*G06Q 40/00* (2012.01)

(52) U.S. Cl.
USPC .............................................. 705/44; 705/39

(58) Field of Classification Search
USPC ...................................................... 705/10–44
See application file for complete search history.

(56) References Cited

U.S. PATENT DOCUMENTS

| | | | |
|---|---|---|---|
| 5,826,243 A * | 10/1998 | Musmanno et al. ............ 705/35 |
| 5,870,723 A * | 2/1999 | Pare et al. ....................... 705/39 |
| 6,993,510 B2 | 1/2006 | Guy et al. |
| 7,204,412 B2 * | 4/2007 | Foss, Jr. ......................... 235/380 |
| 7,316,350 B2 | 1/2008 | Algiene |
| 7,340,423 B1 | 3/2008 | Blagg et al. |
| 7,631,803 B2 * | 12/2009 | Peyret et al. ................... 235/380 |
| 7,945,512 B2 * | 5/2011 | Scipioni et al. ................. 705/39 |
| 7,954,704 B1 * | 6/2011 | Gephart et al. ................ 235/380 |
| 7,979,349 B2 * | 7/2011 | Bishop et al. .................... 705/39 |
| 8,412,627 B2 * | 4/2013 | Allen-Rouman et al. ...... 705/40 |
| 8,515,868 B2 * | 8/2013 | Hirka et al. ...................... 705/41 |
| 8,589,271 B2 * | 11/2013 | Evans .............................. 705/35 |
| 8,606,709 B2 * | 12/2013 | Gupta ............................. 705/40 |
| 2002/0069170 A1 * | 6/2002 | Rizzo et al. ..................... 705/43 |
| 2002/0169720 A1 * | 11/2002 | Wilson et al. ................... 705/44 |
| 2005/0177496 A1 | 8/2005 | Blagg et al. |
| 2005/0185780 A1 | 8/2005 | Grear et al. |
| 2007/0118475 A1 * | 5/2007 | Picciallo et al. ................ 705/42 |

* cited by examiner

*Primary Examiner* — Frantzy Poinvil
(74) *Attorney, Agent, or Firm* — Sutherland Asbill & Brennan LLP

(57) ABSTRACT

Embodiments of the invention may relate to systems and methods providing multiple account holder functionality for stored value accounts. In one embodiment, a method may include executing computer program instructions by one or more processors for receiving a request to create a secondary stored value account for a recipient; creating the secondary stored value account for the recipient; and establishing an association between a primary stored value account and the secondary stored value account. The method may further include establishing transaction rules associated with the secondary stored value account. The transaction rules can include funding rules limiting funding of the secondary stored value account to occur from the primary stored value account, and access rules preventing access to account information associated with the secondary stored value account by a primary account holder associated with the primary stored value account.

30 Claims, 6 Drawing Sheets

SYSTEMS AND METHODS PROVIDING MULTIPLE ACCOUNT HOLDER FUNCTIONALITY

FIELD OF THE INVENTION

Embodiments of the invention relate generally to stored value instruments.

BACKGROUND OF THE INVENTION

Stored value accounts have gained widespread use. Such stored value accounts are typically associated with a stored value card, which may also be referred to as a "gift card" or a "prepaid card." These cards can often be purchased at a retail location, or a financial institution, for a specified amount, e.g., twenty dollars, or for a non-denominated amount whereby the consumer can designate the exact funding amount. Though, other stored value cards, such as payroll cards, may be distributed to card holders by an employer or other third party. Because payroll funds may be difficult to distribute other than by check to those who do not have a bank account, employers may transfer payroll funds to employees' payroll cards that are associated with a stored value account. Stored value cards and associated accounts known as open-loop stored value accounts may be redeemed at many retail locations and in online transactions, for example, wherever the stored value cards' sponsoring network (also referred to as "branded"), such as STAR®, VISA®, MasterCard®, Discover®, or American Express®, is honored. Other stored value cards and accounts, known as closed-loop stored value accounts, are only honored at limited locations, such as at designated merchants.

Because the use of all types of stored value cards and associated accounts has grown over recent years, and continues to grow, there is a need for new methods and techniques to increase market share of stored value accounts by acquiring new customers, increasing the distribution and use, as well as the associated revenue generated from stored value account transactions.

Thus, there exists a need for systems and methods providing multiple account holder functionality for stored value accounts. There exists a further need for systems and methods that increase access to new customers and opening new stored value accounts.

SUMMARY OF THE INVENTION

Some or all of the above needs and/or problems may be addressed by certain embodiments of the invention. Embodiments of the invention may include systems and methods providing multiple account holder functionality for stored value accounts. According to one embodiment, a method for establishing a secondary stored value account associated with a primary stored value account can be provided. The method may include executing computer program instructions by one or more processors for creating a secondary stored value account for a recipient in response to receiving a request to create the secondary stored value account for the recipient; and establishing an association between a primary stored value account and the secondary stored value account. The method may further include executing the computer program instructions for establishing transaction rules associated with the secondary stored value account. The transaction rules can include funding rules limiting funding of the secondary stored value account to occur from the primary stored value account, and access rules preventing access to account information associated with the secondary stored value account by a primary account holder associated with the primary stored value account.

According to another embodiment, a system for processing stored value account transactions can be provided. The system may include a communications interface operable to connect with a network, a memory comprising instructions to process stored value account transactions, and at least one processor in communication with the memory and the communications interface. The at least one processor may be operable to execute the instructions to create a secondary stored value account for a recipient in response to receiving, via the communications interface, a request to create the secondary stored value account for the recipient; and to store in the memory an association between a primary stored value account and the secondary stored value account. The processor may further be operable to execute the instructions to limit funding of the secondary stored value account to occur from the primary stored value account, and to prevent access to account information associated with the secondary stored value account by a primary account holder associated with the primary stored value account.

According to another embodiment, a method for facilitating stored value account transactions can be provided. The method may include executing computer program instructions by one or more processors for receiving, from a third party, instructions to deposit a first value to a primary stored value account; and depositing the first value to the primary stored value account. The method may further include executing the computer program instructions for creating a secondary stored value account, wherein the secondary stored value account is associated in the transaction processing system to the primary stored value account. The method may further include executing the computer program instructions for funding the secondary stored value account by debiting a second value from the primary stored value account and crediting the second value to the secondary stored value account, wherein funding of the secondary stored value account from the primary stored value account is permitted. In addition, the method may include executing the computer program instructions for transmitting, to a secondary account holder associated with the secondary stored value account, account information associated with the secondary stored value account, wherein transmission of the account information associated with the secondary stored value account to a primary account holder associated with the primary stored value account is prevented.

According to another embodiment, a system for establishing a secondary stored value account associated with a primary stored value account can be provided. The system can include means for receiving a request to create a secondary stored value account for a recipient; means for creating the secondary stored value account for the recipient; and means for establishing an association between a primary stored value account and the secondary stored value account. The system can further include means for establishing transaction rules associated with the secondary stored value account. The transaction rules can include funding rules limiting funding of the secondary stored value account to occur from the primary stored value account, and access rules preventing access to account information associated with the secondary stored value account by a primary account holder associated with the primary stored value account.

According to another embodiment, a computer program embodied on a computer-readable medium can be provided for establishing a secondary stored value account associated with a primary stored value account. The computer program embodied on the computer-readable medium can include instructions to create a secondary stored value account for a recipient in response to a request from a primary account holder associated with a primary stored value account; and to establish an association between the primary stored value account and the secondary stored value account. The computer program embodied on the computer-readable medium can further include instructions to establish transaction rules associated with the secondary stored value account. The transaction rules can include funding rules limiting finding of the secondary stored value account to occur from the primary stored value account, and access rules preventing access to account information associated with the secondary stored value account by the primary account holder.

Additional systems, methods, apparatus, features, and aspects are realized through the techniques of various embodiments of the invention. Other embodiments and aspects of the invention are described in detail herein and are considered a part of the claimed invention. Other advantages and features can be understood with reference to the description and to the drawings.

BRIEF DESCRIPTION OF THE DRAWINGS

Figure 1:
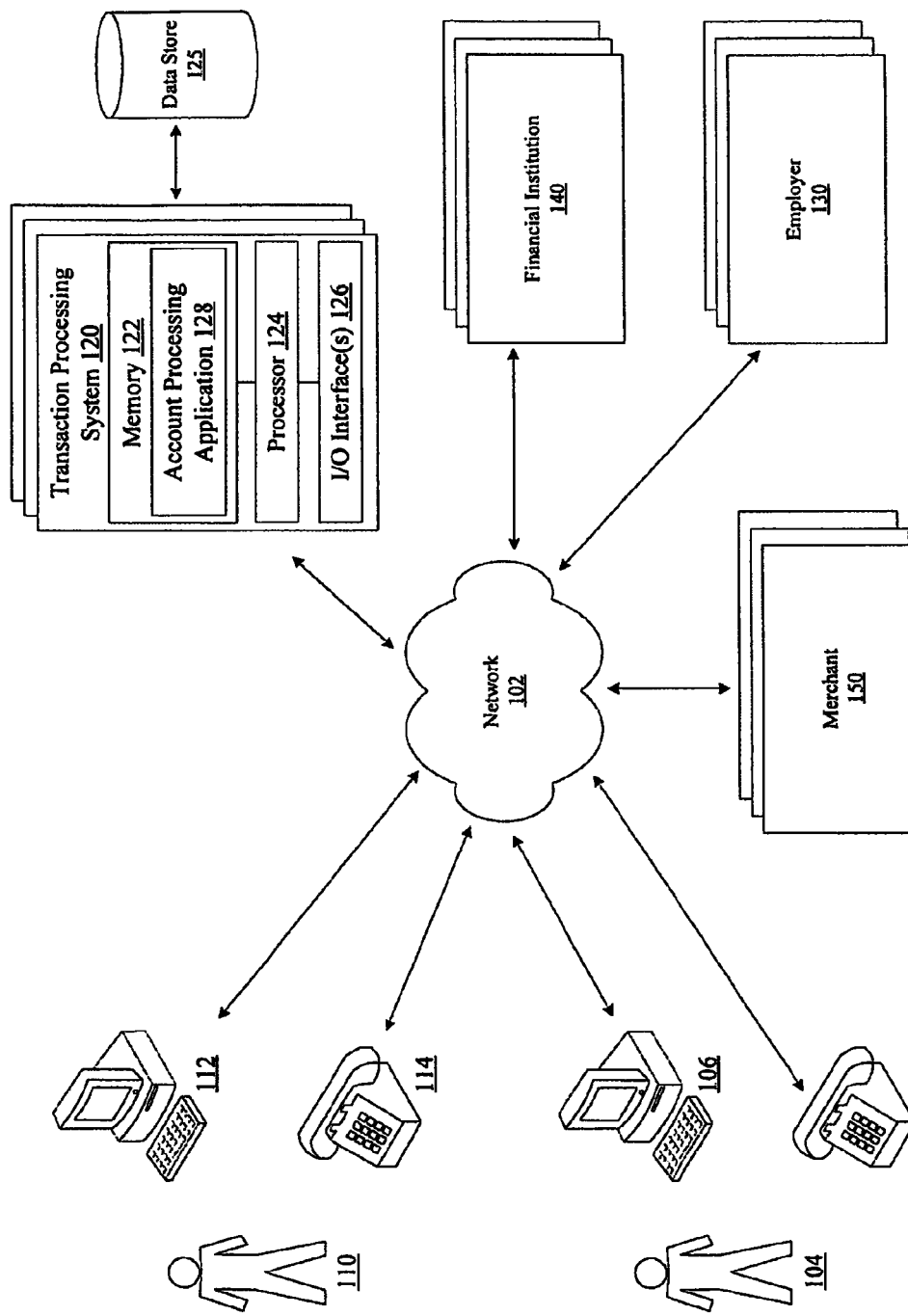
Figure 2:
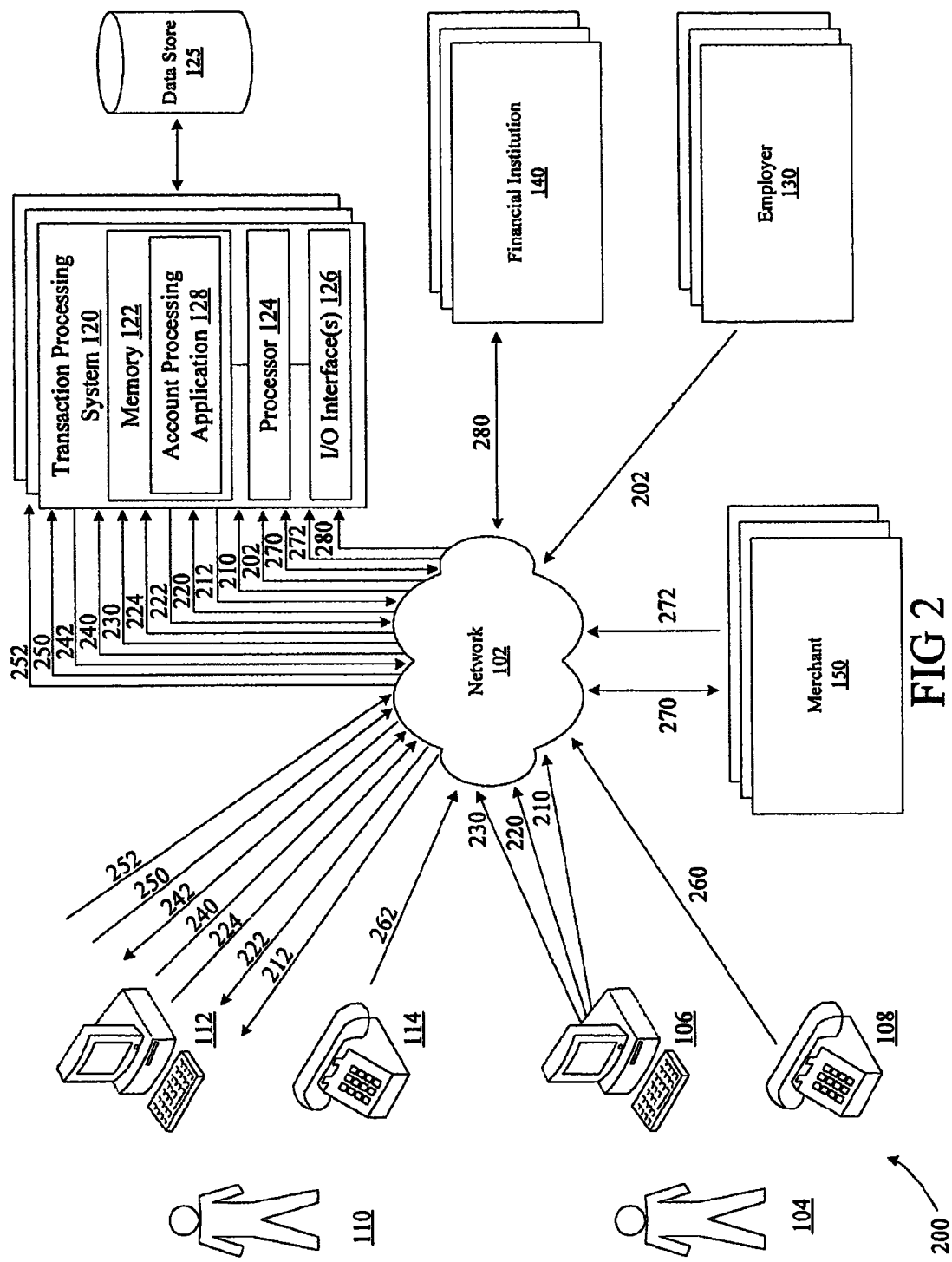
Figure 3:
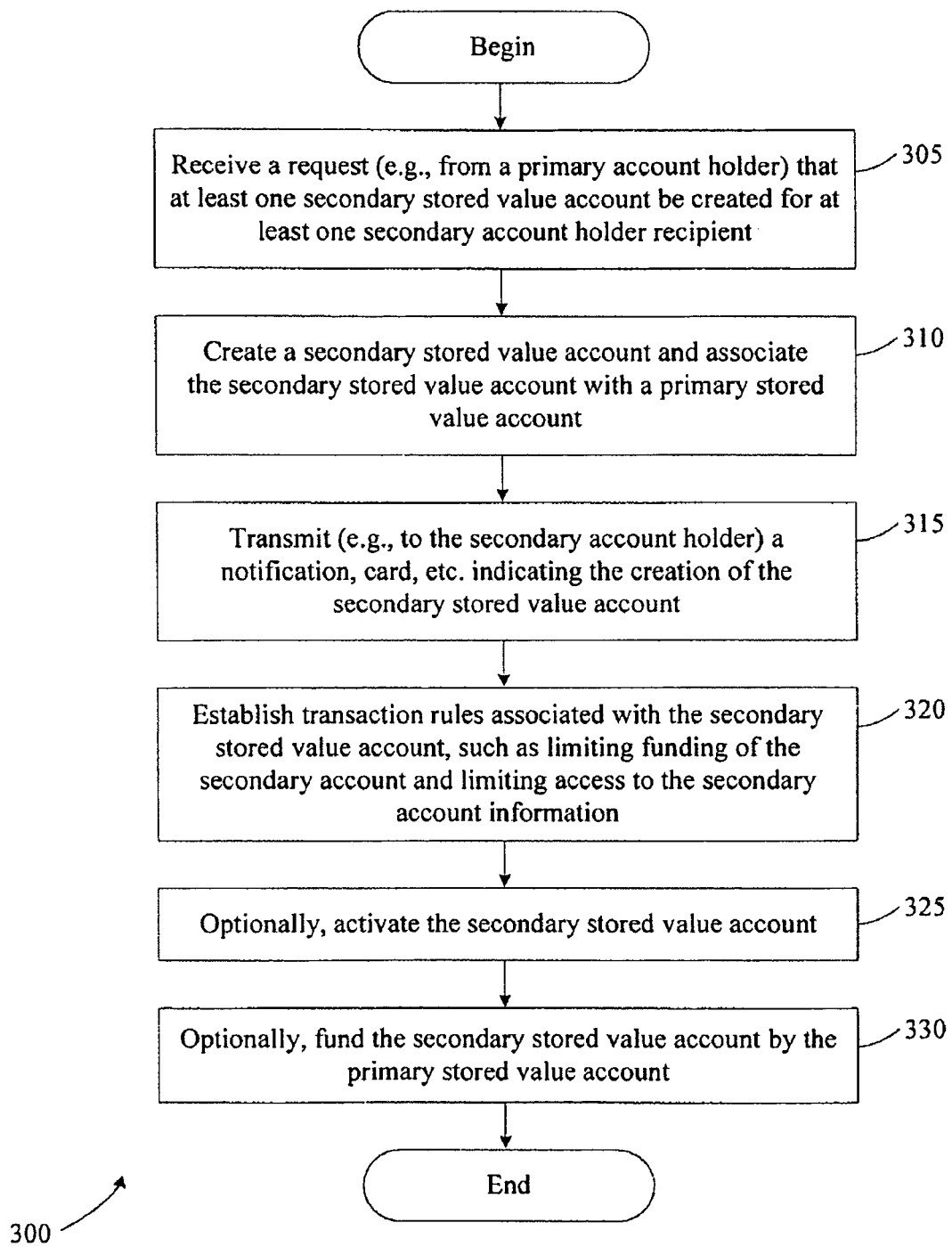
Figure 4:
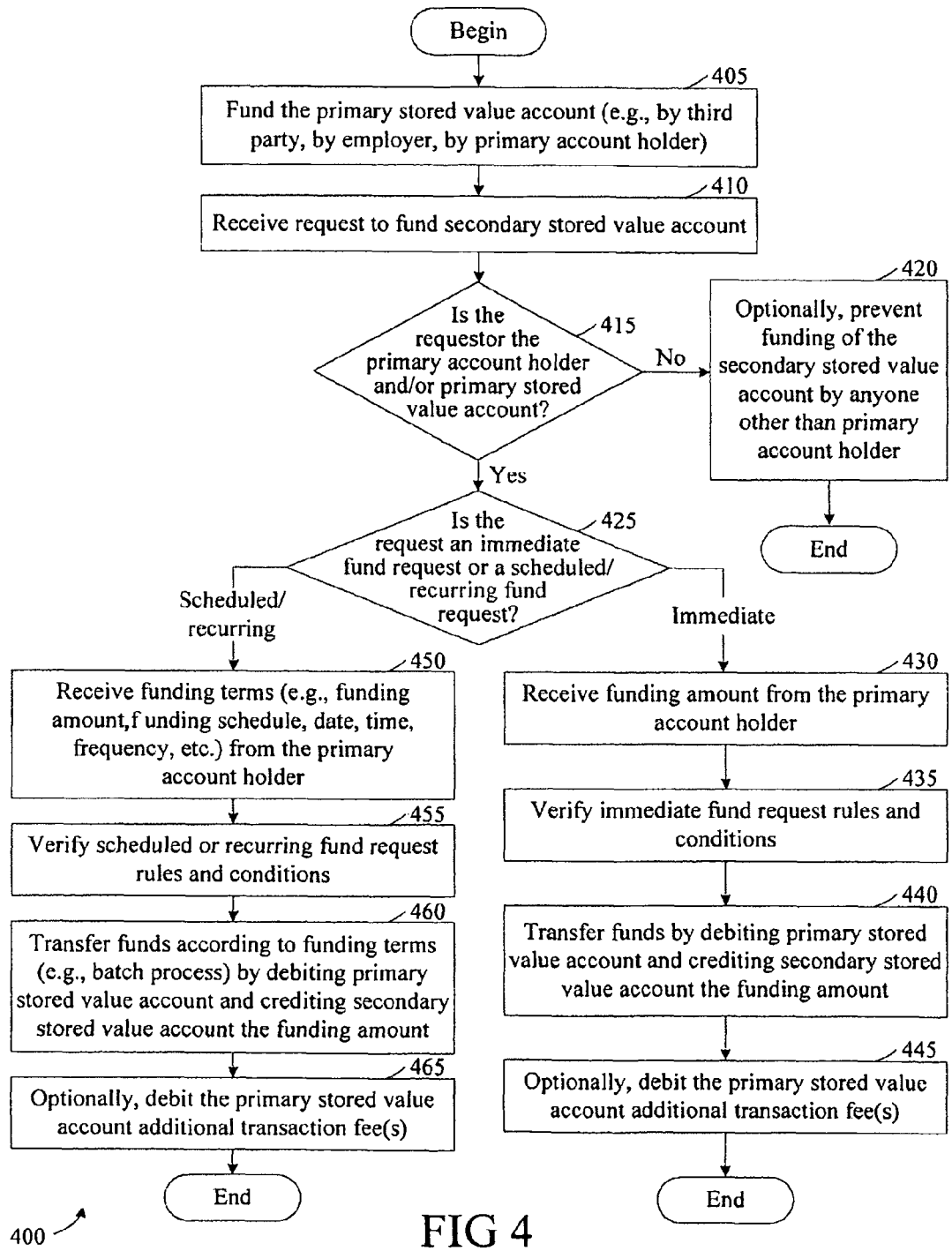
Figure 5:
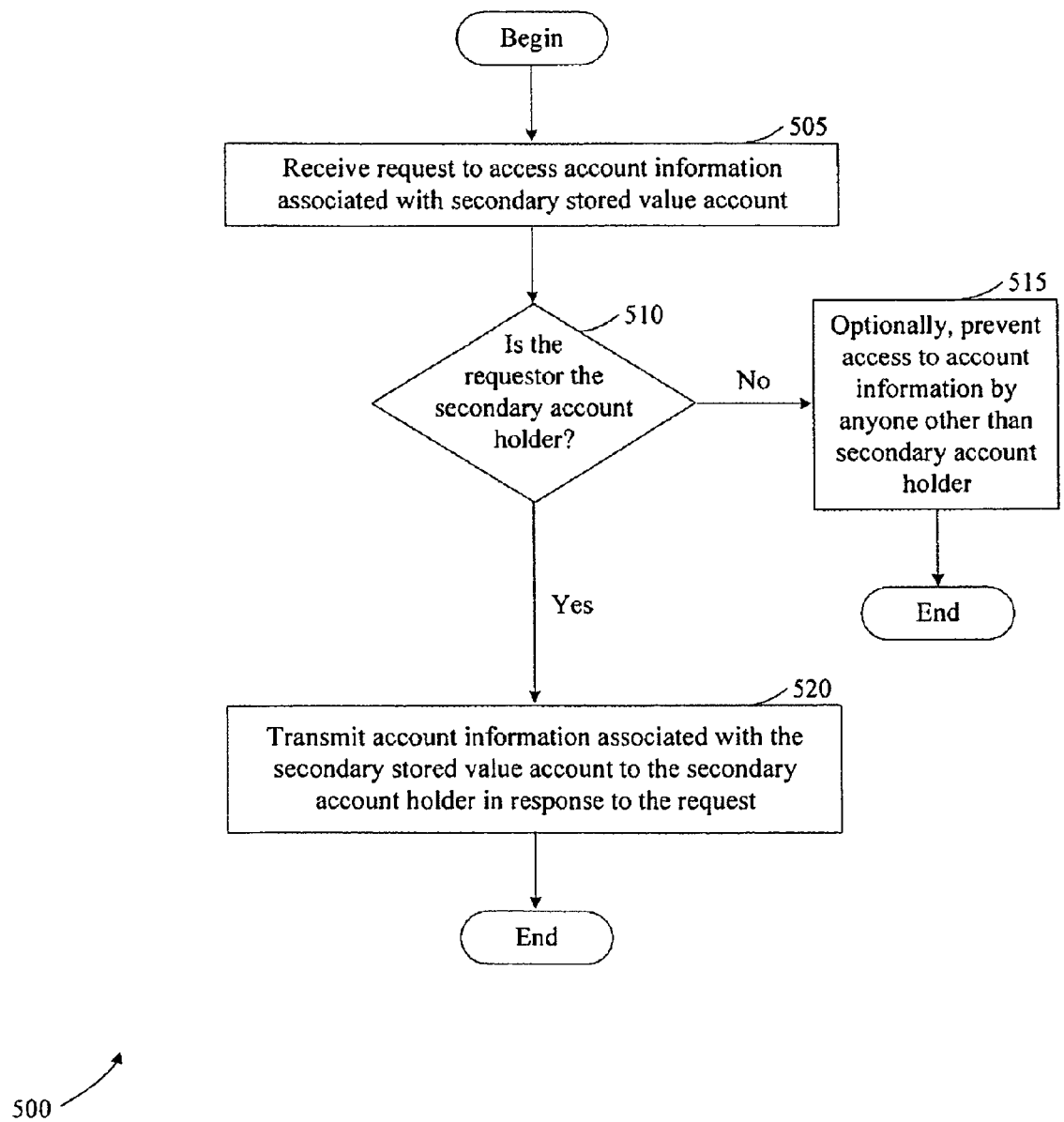
Figure 6:
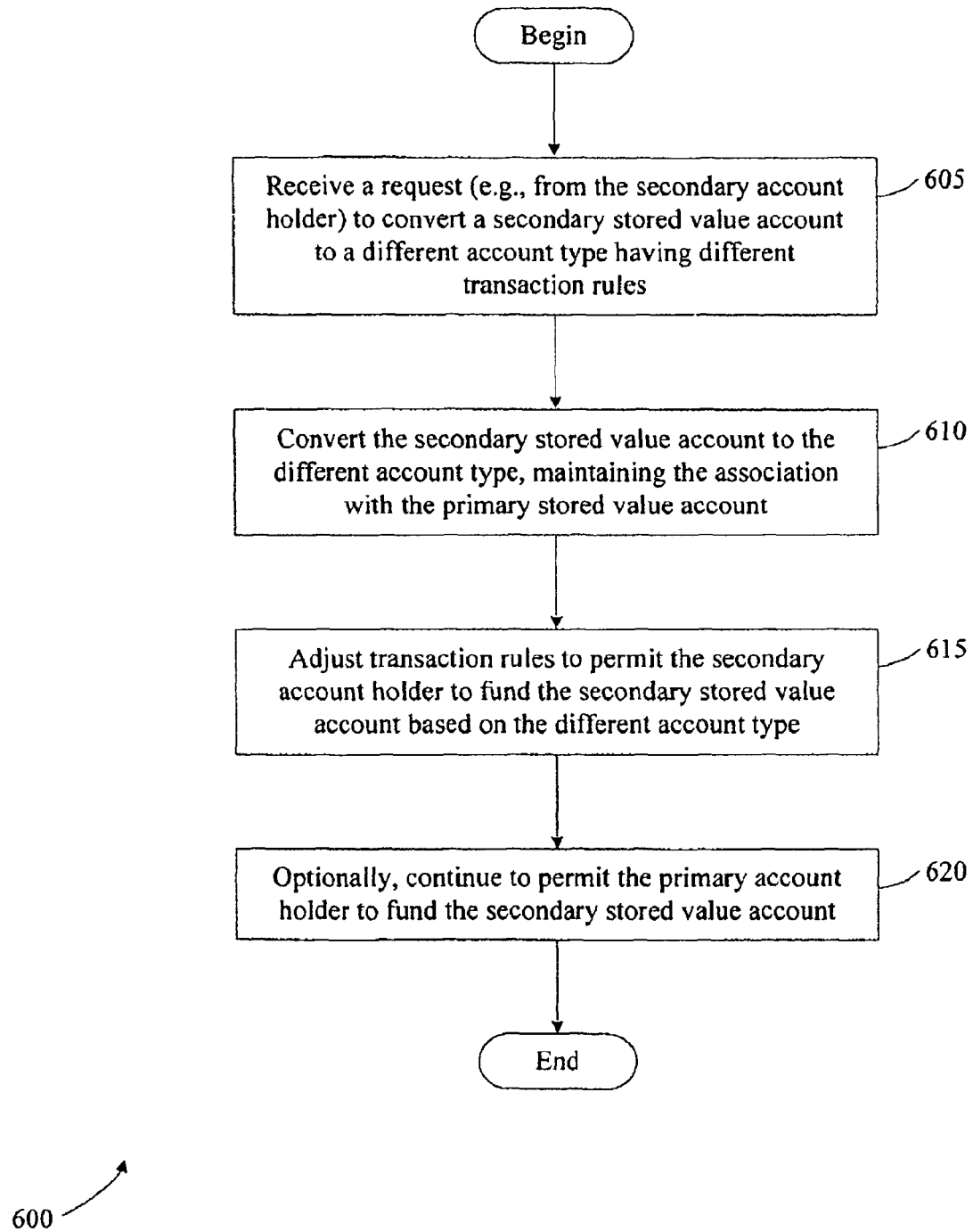

Having thus described the invention in general terms, reference will now be made to the accompanying drawings, which are not necessarily drawn to scale, and wherein:

FIG. 1 illustrates an example functional block diagram of an example system, according to one embodiment of the invention;

FIG. 2 illustrates an example data flow of an example system and method, according to one embodiment of the invention;

FIG. 3 illustrates an example flowchart of an example method, according to one embodiment of the invention;

FIG. 4 illustrates an example flowchart of an example method, according to one embodiment of the invention;

FIG. 5 illustrates an example flowchart of an example method, according to one embodiment of the invention; and FIG. 6 illustrates an example flowchart of an example method, according to one embodiment of the invention,

DETAILED DESCRIPTION OF EMBODIMENTS OF THE INVENTION

Example embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will fully convey the scope of the invention and satisfy applicable legal requirements. Like numbers refer to like elements throughout.

As used herein, the term "stored value account" can refer to any account capable of having a balance that can be funded in advance, which when used in a financial transaction the balance can be adjusted, such as debited when paying with the stored value account, or credited when adding funds to the stored value account. Stored value accounts can be associated with many instruments, such as, but not limited to, a prepaid account, a gift card account, a payroll card account, a debit account, savings, or a checking account.

As used herein, the term "stored value card" can refer to any access device associated with a stored value account or prepaid account as those terms are used herein. Example stored value cards can include, but are not limited to, a gift card, a payroll card, a debit card, a smart card, or a contactless card. Stored value cards may be embodied either as a tangible medium form factor or as an electronic or virtual-type instrument provided by a merchant, a retailer, an employer, a merchant bank, an employer bank, a financial institution, or any other type of entity. In one example, a stored value card can be a denominated plastic card with a predetermined monetary amount associated with the card. In another example, a stored value card can be an electronic certificate with a predetermined monetary amount associated with the certificate. In other examples, a stored value card may be a non-denominated card, whereby a consumer can designate the value to fund the associated account. Example stored value cards may include or have associated therewith, but are not limited to, one or more of the following: an account number, a card number, a personal identification number, a magnetic stripe, a bar code, and/or a contactless transaction means.

As used herein, the terms "account program" and "program" can be used interchangeably, and each can refer generally to a manner for grouping stored value accounts. A specific account program may designate similar rules, limitations, and other properties for each of the stored value accounts associated therewith. In example embodiments, unique account programs are assigned to or otherwise created for individual customers of the program manager/account processor, such as for each employer participating in a stored value payroll account, for each financial institution customer providing stored value accounts, and the like. However, in example embodiments, one customer or other entity may have or participate in more than one account program, and more than one customer or entity may participate in the same account program.

As used herein, the term "electronically" can refer to performing an action with, on, controlled by, or aided by one or more of the system components, as described in more detail herein. Generally, the term electronically may describe actions performed at least in part with, on, by, or aided by a computer, computer network, other processor-driven device, or any combination thereof. The term electronically is not intended to be limiting, and does not exclude operations including magnetic reading, storing, or transmission or optical reading, storing, or transmission of data.

In accordance with embodiments of the invention, systems and methods for providing multiple account holder functionality for stored value accounts are provided. Stored value accounts provide an alternative to traditional banking, such as savings or checking accounts with traditional financial institutions like retail banks. Stored value accounts and associated stored value cards may also provide an alternative to conventional card-based payment instruments, such as credit cards and/or debit cards. Some consumers may not have access to these and other conventional banking and payment resources. Embodiments described herein provide for an additional means for encouraging consumer participation in and creation of stored value account programs. Accordingly, by example embodiments of the invention, an account program manager, account processor, or any other entity associated with the creating, processing, selling, issuing, and/or sponsoring of stored value accounts, may broaden their access to additional stored value account customers by providing a unique means for existing stored value account holders to invite others to join.

In one example, a "primary account holder" that is already an existing stored value account customer, which may likewise be referred to herein as a "primary stored value account," may invite or otherwise request a stored value account to be created for a new customer. A newly created stored value account may be referred to herein as a "secondary stored value account" and the new customer for whom the account is created may be referred to herein as a "secondary account holder" or "recipient." The information for creating a secondary stored value account may be provided in whole by a primary account holder, or the secondary account holder may aid in providing information and completing the account creation processing. Account creation, funding, account information access, payment, settlement, and other stored value account processing may be performed by an account program manager/account processor, which may be referred to interchangeably herein as "account program manager," "program manager," "account processor," and "processor." The account processor may be associated with a transaction processing system, as described in more detail herein, for processing transactions and other requests associated with stored value accounts.

A newly created secondary stored value account may have certain transaction rules associated therewith. The transaction rules may vary based on account program, based on entities associated with the primary and/or secondary stored value account, based on the account processor, and the like. In one example, the primary stored value account may be an employer payroll stored value account which may be funded in part by the primary account holder's employer. As an example of transaction rules, the secondary stored value account may inherit some or all of the payroll stored value account transaction rules. In other embodiments, the transaction rules may be altered, such as to limit funding of the secondary stored value account to occur from certain parties, such as the primary account holder, or from certain accounts, such as the primary stored value accounts. Other transaction rules may limit who may access information associated with the stored value accounts. For example, to provide relative independence and privacy for each of the primary and the secondary account holder, example transaction rules may only allow each to view or otherwise obtain access to the account information associated with their respective stored value accounts. As described herein, transaction rules may be altered by one or more of the parties or participating entities for various reasons. For example, according to one embodiment, the transaction processing system may permit a secondary account holder to convert the stored value account type, which may cause a change in the associated transaction rules, such as by allowing the secondary account holder to fund the secondary stored value account after the account conversion.

In one example embodiment, the above described stored value account transactions and transaction rules may be at least in part processed by a transaction processing system operated by or on behalf of an account processor. Example transactions that may be processed by the transaction processing system may include, but are not limited to, account creation transactions, account funding transactions, account information access transactions, account type conversion transactions, merchant payment transactions, online payment transactions, reconciling and settlement transactions, and reporting transactions.

FIG. 1 illustrates an example environment and system in accordance with an embodiment of the invention. In this example, the environment can be a client-server configuration, and the system can be a secondary stored value account management system 100. The system 100 is shown with a communications network 102, such as the Internet and/or a telephone network, in communication with one or more account holder client devices 106, 108, 112, 114, such as personal computers or telecommunications devices. The system 100 includes at least one transaction processing system 120, such as may be operated by or on behalf of one or more third party payment processors or account program managers, at least one employer system 130, at least one financial institution system 140, such as an issuing bank or merchant bank, and at least one merchant system 150, such as may include a point of sale ("POS") terminal. It will be appreciated that while the foregoing may describe only a single transaction processing system 120, employer system 130, financial institution system 140, and merchant system 150, there may be multiple transaction processing systems, employer systems, financial institution systems, and/or merchant systems, without departing from example embodiments of the invention.

The communications network(s) 102 shown in FIG. 1 may include any telecommunication and/or data network, whether public, private, or a combination thereof, including a local area network, a wide area network, an intranet, an internet, the Internet, intermediate hand-held data transfer devices, a publicly switched telephone network ("PSTN"), a cellular network, and/or any combination thereof and may be wired and/or wireless. The network 102 may also allow for real-time, off-line, and/or batch transactions to be transmitted between or among the transaction processing system 120, employer system 130, financial institution system 140, and/or merchant system 150. Due to network connectivity, various methodologies as described herein may be practiced in the context of distributed computing environments. It will also be appreciated that the network 102 may include a plurality of networks, each with devices such as gateways and routers for providing connectivity between or among networks 102. Instead of, or in addition to, a network 102, dedicated communication links may be used to connect the various devices in accordance with an example embodiment of the invention. For example, the transaction processing system 120 may form the basis of network 102 that interconnects the employer system 130, financial institution system 140, and/or merchant system 150.

In the system illustrated in FIG. 1, at least one primary account holder 104 may operate a primary client device 106 and/or a primary telecommunications device 108, and at least one secondary account holder 110 may operate a secondary client device 112 and/or a secondary telecommunications device 114. The primary client device 106 and the secondary client device 112 may be any processor-based device operable to communicate over a network. Example client devices include a personal computer, a mobile computer, a handheld portable computer, a digital assistant, a personal digital assistant, a cellular phone, a mobile phone, a smart phone, a pager, a digital tablet, a desktop computer, a laptop computer, an Internet appliance, or any other processor-based device. A respective communication or input/output interface associated with each client device 106, 112 can facilitate communications between the client devices 106, 112 and the network 102. Each client device 106, 112, can include a processor and a computer-readable medium, such as a random access memory ("RAM"), read only memory ("ROM"), and/or a removable storage device, coupled to the processor. The processor can execute computer-executable program instructions stored in memory. Client devices 106, 112 may operate on any operating system capable of supporting a browser or browser-enabled application including, but not limited to, Microsoft Windows®, Apple OSX™, and Linux. The client devices 106, 112 shown include, for example, personal computers executing a browser application program such as Microsoft Corporation's Internet Explorer™, Netscape Communication Corporation's Netscape Navigator™, Apple's Safari™, and Mozilla Firefox™. The client devices 106, 112 also include one or more input/output ("I/O") interface(s) to facilitate communication with one or more other components of the system 100, such as, with one or more transaction processing systems 120, one or more employer systems 130, one or more financial institution systems 140, and/or one or more merchant systems 150.

The primary telecommunications device 108 and secondary telecommunications device 114 may be any device operable to communicate over a wired or wireless telecommunications network, and interacting with an interactive voice response unit ("IVRU") system and/or with a messaging service. Example telecommunications devices include an analog telephone, a digital telephone, a cellular telephone, a mobile phone, a smart phone, an internet protocol telephone, or any other telecommunications device. Each client device 106, 112 and/or telecommunications device 108, 114 are used by a primary account holder and/or a secondary account holder to communicate with the transaction processing system 120, for instance when requesting secondary account holder accounts, when processing funding transactions, or when accessing account information. Moreover, the client devices 106, 112 and/or telecommunications devices 108, 114 may be used to conduct transactions using the account holder's respective stored value accounts, such as when conducting online shopping or when processing online bill payments. Each telecommunications device 108, 114, such as a cellular telephone or smart phone, can also include a processor and a computer-readable medium, such as RAM, ROM, and/or a removable storage device, coupled to the processor. Devices including a processor can execute computer-executable program instructions stored in memory. In one example, the primary and/or secondary telecommunications devices 108, 114 may be used to communicate with the transaction processing system 120 to effect one or more of the features described herein via short messaging service ("SMS"), email, or any other technique of electronic communications, which the transaction processing system 120 can receive, process, and generate the appropriate response and/or action.

As mentioned, the system 100 includes one or more transaction processing systems 120 in communication with the client devices 106, 108, 112, 114, the employer systems 130, the financial institution systems 140, and the merchant systems 150 over the one or more networks 102. The transaction processing system 120 is used to facilitate processing stored value account transactions, such as may be performed by an account processor and/or account program manager. The processor and/or program manager associated with the transaction processing system 120 may perform account and card services for or on behalf of other entities, such as for card issuing financial institutions (which may otherwise be referred to herein as "issuers," "card issuers," or "account issuers"). In other embodiments, the transaction processing system 120 may be a distributed system, and at least some of the functionality described herein with reference to the transaction processing system may be performed in a distributed manner by one or more of the other entities and/or systems described herein.

The transaction processing system 120 may include one or more transaction processing systems, which may include server devices, mainframe computers, networked computers, a processor-based device, or any other suitable processor-based devices for electronically processing financial transactions received over a network and communicated between individuals, merchants, financial institutions, employers, and other entities. The transaction processing system 120 can include at least one processor 124, a memory 122, and one or more I/O interface(s) 126. The memory 122 may be any computer-readable medium, such as RAM, ROM, and/or a removable storage device, coupled to the processor 124. The memory 122 may include an operating system ("OS"), such as, but not limited to, Microsoft Windows®, Apple OSX™, or Linux, and a database management system ("DBMS") to facilitate management of data files and data stored in the memory 122 and/or stored in a data store 125, for example. The processor 124 is operable to execute computer-executable program instructions stored in memory 122, which may include an account processing application 128. The account processing application 128 includes instructions for processing typical financial transactions, such as activations, funding, account access, payments, account migration or conversions, settlement and reconciling transactions, account and account data management, account holder data management, merchant, financial institution, and other customer data management, and any other transactions as may typically be performed by a stored value card or other payment instrument processor. More specifically, according to one embodiment, the account processing application 128 includes instructions for processing requests for secondary stored value accounts from primary account holders, enrolling secondary account holders, funding primary and secondary accounts, and managing transaction rules for controlling transactions and access to account information stored in memory 122, including funding rules and access rules. The account processing application 128 may additionally operate in conjunction with one or more of the I/O interfaces 126 to facilitate communication with one or more other components of the system 100, such as, with one or more client devices 106, 108, 112, 114, one or more employer systems 130, one or more financial institution systems 140, and/or one or more merchant systems 150. It will be appreciated that the transaction processing system 120 may be implemented on a general purpose computer or may be a specialized machine in which a computer is customized to perform at least the functions of the account processing application 128, according to an example embodiment of the invention.

The one or more employer systems 130 can be any employer, or associated third party agent, such as a payroll processor, that includes one or more computer or processor-based devices capable of communicating with the communications network 102 via a signal, such as a wireless frequency signal or a direct wired communication signal. In at least one embodiment, more than one employer system 130 can be in communication with communications network 102 to transmit and receive communications between other system components. Similar to the transaction processing system 120, the employer system 130 can include or otherwise be associated with a processor and a computer-readable medium, such as RAM, ROM, and/or a removable storage device. In one embodiment, the employer system 130 includes computer executable program instructions stored in memory for managing employee payrolls and issuing employee paychecks, direct deposits, and other compensation and/or benefits transactions. The employer system 130 can also include one or more I/O interface(s) to facilitate communication with one or more other components of the system 100, such as with one or more client devices 106, 108, 112, 114, one or more transaction processing systems 120, one or more financial institution systems 140, and/or one or more merchant systems 150, for example, over the network 102. According to one example embodiment, the employer system 130 can communicate with the transaction processing system 120 via the one or more networks 102 to aid in electronic processing of compensation and/or benefits transactions. In one embodiment, the network 102 may be a banking network, such as an ACH network, for processing compensation transactions for employees' stored value accounts and/or other financial instruments or accounts.

The one or more financial institution systems 140 can be any financial institution, such as an issuing bank for stored value accounts, a merchant bank, an employer bank, and/or a processor bank. A financial institution system 140 can include one or more computer or processor-based devices capable of communicating with the communications network 102 via a signal, such as a wireless frequency signal or a direct wired communication signal. In at least one embodiment, more than one financial institution system 140 can be in communication with communications network 102 to transmit and receive communications between other system components. Similar to the transaction processing system 120, the financial institution system 140 can include or otherwise be associated with a processor and a computer-readable medium, such as RAM, ROM, and/or a removable storage device. In one embodiment, the financial institution system 140 includes computer executable program instructions stored in memory for maintaining financial accounts, such as consumer stored value accounts processed by one or more account processors associated with the transaction processing system 120, merchant bank accounts, employer bank accounts, and/or employee bank accounts, and for settling transactions associated therewith. The financial institution system 140 can also include one or more I/O interface(s) to facilitate communication with one or more other components of the system 100, such as with one or more client devices 106, 108, 112, 114, one or more transaction processing systems 120, one or more employer systems 130, and/or one or more merchant systems 150, for example, over the network 102. According to one example embodiment, the financial institution system 140 can communicate with the transaction processing system 120 via the one or more networks 102, which may include a banking network, such as an ACH network, for processing financial and account transactions between the entities of the system 100.

The one or more merchant systems 150 can be one or more systems at any merchant, such as a retailer or a services provider, for processing consumer transactions. The merchant systems 150 may at least include a POS transaction terminal for capturing transaction information, for interfacing with a cash register, for displaying information to a terminal operator and/or a consumer, and for processing transactions with an account processor, such as a transaction processing system 120. Example consumer transactions that may be processed by a merchant system 150 may include, but are not limited to, purchasing, payment, account inquiry, account activation, loading, and reloading transactions.

A merchant system 150 can include one or more computer or processor-based devices capable of communicating with the communications network 102 via a signal, such as a wireless frequency signal or a direct wired communication signal. In at least one embodiment, more than one merchant system 150 can be in communication with communications network 102 to transmit and receive communications between other system components. Similar to the transaction processing system 120, the merchant systems 150 can include or otherwise be associated with a processor and a computer-readable medium, such as RAM, ROM, and/or a removable storage device. Merchant systems 150 may operate on any operating system capable of supporting an application program including, but not limited to, Microsoft Windows®, Apple OSX™, and Linux. In one embodiment, the merchant system 150 includes computer executable program instructions stored in memory for processing consumer transactions within the merchant system 150 and with other back-end account processors, such as the transaction processing system 120 and/or any other financial institutions or third-party service providers. The merchant system 150 can also include one or more I/O interface(s) to facilitate communication with one or more other components of the system 100, such as, with one or more client devices 106, 108, 112, 114, one or more transaction processing systems 120, one or more employer systems 130, and/or one or more financial institution systems 140, for example, over the network 102. According to one example embodiment, the merchant system 150 can communicate with the transaction processing system 120 via the one or more networks 102, which may include a proprietary private network, a banking network, such as an ACH network, or a combination thereof, for processing financial and account transactions between the entities of the system 100. Merchant system 150 POS terminals may also include a number of other external or internal devices such as a card reader, a magnetic card reader, an RFID reader, a mouse, a CD-ROM, a DVD, a keypad, a keyboard, a display, or other input or output devices. In addition to or instead of a conventional POS terminal, a merchant system 150 may include electronic cash registers, electronic kiosks, mobile computers, handheld portable computers, digital assistants, personal digital assistants, cellular phones, mobile phones, smart phones, pagers, digital tablets, desktop computers, laptop computers, Internet appliances, and other processor-based devices, and/or may be implemented via a web portal or other electronic commerce service.

In one embodiment, a suitable merchant system 150 and associated software can include, but is not limited to, Aloha® EDC Server, Datacap Systems Datatran™, DataVantage® Tradewind®, EMN8® OrderM8™, Exadigm Mate Plus, Hypercom® T4100, IBM® Websphere®, Infogenesis Revelation, Ingenico® Ingepay™, Micros®, Oracle® iPayment, Radiant® Systems Epsilon, Southern Datacomm Protobase®, and VeriFone Omni™ based systems.

Generally, each of the memories, such as the memory 122 and the data store 125 of the transaction processing system 120, and those associated with the client devices 106, 112, 108, 114, the employer system 130, the financial institution system 140, and the merchant system 150 can store data and information for subsequent retrieval. In this manner, the system 100 can store various received or collected information in memory or a database associated with one or more client devices 106, 112, transaction processing systems 120, employer systems 130, financial institution systems 140, and/or merchant systems 150. The memories and data stores or databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the data stores or databases shown can be integrated or distributed into any number of databases or data stores.

Suitable processors for client devices 106, 112, 108, 114, transaction processing system 120, employer system 130, financial institution system 140, and/or merchant system 150 may comprise a microprocessor, an ASIC, and a state machine. Example processors can be those provided by Intel Corporation (Santa Clara, Calif.), AMD Corporation (Sunnyvale, Calif.), and Motorola Corporation (Schaumburg, Ill.). Such processors comprise, or may be in communication with media, for example computer-readable media, which stores instructions that, when executed by the processor, cause the processor to perform the elements described herein. Embodiments of computer-readable media include, but are not limited to, an electronic, optical, magnetic, or other storage or transmission device capable of providing a processor, such as the processor 124 of the transaction processing system 120, or any other processors, for example those used by the client devices 106, 112, 108, 114, employer system 130, financial institution system 140, and/or merchant system 150 with computer-readable instructions. Other examples of suitable media include, but are not limited to, a floppy disk, a CD-ROM, a DVD, a magnetic disk, a memory chip, ROM, RAM, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

A consumer, such as a primary account holder 104 or a secondary account holder 110, can interact with a client device, such as a personal computer, like client devices 106, 112, via any number of input and output devices, such as an output display device, a keyboard, and/or a mouse. In this manner, the primary account holder 104 or secondary account holder 110 can access one or more webpages located on a website server hosted by or on behalf of the account processor and associated with the transaction processing system 120 via an Internet browser application program operating on a client device 106, 112. According to one example embodiment a primary account holder 104 can input information associated with a stored value account and/or stored value card via the primary client device 106, or the secondary account holder 110 can input information associated with a stored value account and/or stored value card via the secondary client device 112. The primary account holder 104 may interact with the primary client device 106 to fund the primary stored value account, to view employer funding of the primary stored value account, request a secondary stored value account for the secondary account holder, and/or to fund the secondary stored value account. The secondary account holder 110 may interact with the secondary client device 112 to complete enrollment information for a requested secondary stored value account, to view account information associated with the secondary stored value account, to request a conversion to a different account type, and/or to fund the secondary stored value account. After one or more transactions have been entered into the client device(s) 106, 112, and processed by the transaction processing system 120, the client device(s) 106, 112 can facilitate providing an output to the primary and secondary account holders 104, 110.

In addition, the primary account holder 104 and/or the secondary account holder 110 can process transactions with and/or request information from the transaction processing system 120, such as requesting a secondary account holder account or request to fund an associated account, via the primary telecommunications device 108 and the secondary telecommunications device 114, respectively. The primary and secondary telecommunications devices 108, 114 can be used to speak directly with a customer service agent associated with the transaction processor and/or to interface with an IVRU to process requests and transactions with the transaction processing system. The primary account holder 104 and/ or the secondary account holder 110 can also process transactions with and/or request information from the transaction processing system 120 using one or more components of the merchant system 150, such as by using a POS terminal or a kiosk, as well as conducting typical transactions, such as a purchase transaction using a stored value card.

Other system embodiments in accordance with the invention can include fewer or greater numbers of components and may incorporate some or all of the functionality described with respect to the system components shown in FIG. 1.

FIG. 2 shows an example data flow 200 between the components and entities shown associated with the system 100 for providing multiple account holder functionality for stored value accounts. In particular, the example data flow 200 illustrates example transactions by which a primary account holder 104 may request a secondary stored value account for a secondary account holder 110, as well as funding the primary stored value account by an employer 130, funding the secondary stored value account by the primary account holder 104, accessing secondary account information by the secondary account holder 110, converting the secondary stored value account to a different account type, and funding the secondary stored value account by the secondary account holder 110 after conversion.

According to one example embodiment, a primary account holder 104 may have a primary stored value account. The primary stored value account and associated primary stored value card which may serve as an alternative to traditional banking services. In addition, according to one example embodiment, the primary stored value account and associated card may be supplied by the primary account holder's 104 employer, such as an employer 130, and the account may be used to deposit payroll funds. Accordingly, the employer 130 may transmit a payroll deposit 202 for the primary stored value account via the network 102 to the transaction processing system 120. The payroll deposit 202 may be conducted using a conventional ACH transaction, according to one embodiment; though other electronic deposit transactions may be used, such as over a proprietary network with the transaction processing system 120. Moreover, in other embodiments, the employer 130 may process the payroll deposit directly with a financial institution associated with the stored value account, which may then update or interact with the transaction processing system 120 to update the balance and other account information associated with the stored value account.

Although the data flow 200 describes an employer 130 as funding the primary stored value account, in other embodiments another third party entity may fund the primary stored value account. In addition, the primary account holder 104 may also fund the primary stored value account, such as by using a client device 106 or a telecommunications device 108 over an IVRU interfacing with the transaction processing system 120, or through a merchant system 150, such as a POS terminal or a kiosk.

According to one embodiment of the invention, the primary account holder 104 may request that a secondary account holder account be created for a secondary account holder 110. This may be requested, for example, for a family member of the primary account that does not or cannot use traditional banking services, such as a savings account, checking account, or debit account. Thus, in one example, the primary account holder 104 may request 210 via the primary client device 106, such as by a webpage, that a secondary stored value account be created. The account creation request 210 may be transmitted from the primary client device 106 to the transaction processing system 120 via the network 102, such as over the Internet. In another example, the primary account holder 104 may conduct an account creation request 210 via a telecommunications device 108, such as via an IVRU and/or with a customer service agent. The account creation request 210 may include, but is not limited to, information identifying the primary account holder 104 and the associated primary stored value account, as well as information identifying the secondary account holder 110. The request 210 may also be in the form of an instruction.

In response, the transaction processing system 120 and the associated account processing application 128 may transmit a notification 212 of the newly requested secondary stored value account to the secondary account holder 110. The notification 212 may be electronically transmitted via the network 102, such as by email or other Internet or network-based notification, and accessible by the secondary client device 112, for instance. The notification 212 may include, but is not limited to, information identifying the primary account holder 104, information identifying the secondary account holder 110, secondary stored value account information, secondary account holder 110 verification information, optionally an enrollment confirmation request, and/or terms and conditions associated with the secondary account holder account. In one embodiment, the notification 212 may optionally include sufficient secondary stored value account information, such as account number, card number, and/or personal identification number ("PIN") to allow the secondary account holder 110 to use the account immediately, prior to receiving the associated secondary stored value card. In example embodiments, the secondary account holder 110 may input and transmit a response over the network 102 to the transaction processing system 120 using the secondary client device 112, for example, to authorize activation of the secondary stored value account, for instance providing identifying information, information identifying the primary account holder 104, and the like.

In example embodiments, the terms and conditions may describe to the secondary account holder 110: that unless the secondary stored value account is converted to a different type, only the primary account holder 104 can fund the secondary stored value account; that only the secondary stored value account holder has access to associated account information; that the secondary account holder 110 cannot access primary stored value account information; that the secondary stored value account may be converted to a different account type providing additional features and benefits; and/or any combination thereof, as is appropriate for the account program under which the secondary stored value account is created. These terms and conditions are exemplary only, and differing terms and conditions may be associated with stored value accounts. The transaction processing system 120 may maintain these terms and conditions, which may also be generally referred to herein as "transaction rules." Various entities may be able to define and adjust the transaction rules, such as by an employer 130 providing the stored value account to a primary account holder 104, by a financial institution 140 issuing the primary and secondary stored value accounts, by the payment processor associated with the transaction processing system 120, by a merchant 150 sponsoring and/or distributing stored value accounts and associated stored value cards, by the primary account holder 104, and/or any combination thereof According to another example embodiment, the primary account holder 104 may simply generate an invitation for a secondary account holder 110 to complete an application or other enrollment information to activate a secondary stored value account. The primary account holder 104 may interact with the primary client device 106 and input secondary account holder contact information, such as a name and an email address, and transmit the invitation request 220 via the network 102 to the transaction processing system 120 to generate a more detailed enrollment/application form 222 for electronic transmission to the secondary account holder 110, viewable by the secondary client device 112, for instance. Accordingly, the secondary account holder 110 may receive the invitation request 220 via the network 102, such as by an email, and proceed to enter personal information, such as name, address, birth date, and the like, to complete an enrollment/application form for a secondary stored value account. In response, the secondary account holder 110 may enter the requested information to the secondary client device 112, which may optionally include verification or authorization information to verify that the secondary account holder is the intended recipient of the invitation, and transmit the completed enrollment/application form 224 to the transaction processing system 120 over the network 102 to create the secondary stored value account. In one embodiment, the verification or authorization information requested from the secondary account holder 110 may be information that identifies the primary account holder 104, such as a date of birth or birthplace. In another embodiment, the verification or authorization information may be a password, alphanumeric code, or any other unique, confidential information, which may be transmitted electronically, orally, by mail, and the like, by either the transaction processing system 120 or by the primary account holder 104.

In example embodiments, a transaction fee for opening a secondary stored value account may be charged to at least one of the account holders, such as to the primary account holder 104, which may also be debited from the primary stored value account and credited to another account, such as one associated with the transaction processor and/or the issuing financial institution.

Although the example illustrated and described with reference to FIG. 2 provides for the primary account holder 104 requesting the secondary stored value account be created, it is appreciated that in other embodiments, the request may come from one or more of the other entities, such as from an employer 130, a financial institution 140, and/or a merchant 150. For example, any of the aforementioned entities may send the request for or on behalf of the primary account holder 104. Likewise, any of the aforementioned notifications, invitations, or other account creation communications may also be transmitted to the primary account holder 104 and/or secondary account holder 110 by first being transmitted to one or more of the other entities, which then can transmit the communications to the proper party.

Upon or after creating a secondary stored value account, the primary account holder 104 may transmit a funding request 230 to the transaction processing system 120 from the primary client device 106 via the network 102 to add funds to the secondary stored value account. According to one example embodiment, only the primary account holder 104 is able to fund the secondary stored value account until the secondary stored value account is converted to a different account type (e.g., from a pooled account to a demand deposit account). The transaction processing system 120, including the account processing application 128, can process the funding request 230 to determine whether to allow the funding request. For example, transaction rules may provide limits, such as amount limits, multiple requests over given time period, restrictions placed on primary account holder's 104 account, and the like. Upon approving the funding request 230, the transaction processing system 120 and its associated account processing application 128 may perform corresponding debits to the primary stored value account and credits to the secondary account holder accounts. In example embodiments, a transaction fee may be charged for processing a funding request 230 to at least one of the account holders, such as to the primary account holder 104, which may also be debited from the primary stored value account and credited to another account, such as one associated with the transaction processor and/or the issuing financial institution. In addition, the transaction processing system 120 may generate and transmit a notification of the funding transaction to the secondary account holder 110 and/or the primary account holder 104.

According to one embodiment, the transaction rules limit access to account information to the respective account holders, such that the primary account holder 104 cannot access account information (or other information) associated with the secondary stored value account and the secondary account holder 110 cannot access account information (or other information) associated with the primary stored value account. Restricting access in this manner is quite distinct from other know account and sub-account features available, as most known sub-accounts are merely additional account holders associated with the primary account and/or issued under the same account program. Thus, with the known account and sub-account offerings, the primary account holder has access to all of the information associated with the sub-accounts, and sometimes the sub-account holders may access the primary account information. Differently here, however, the transaction rules limit account access between the primary stored value account and the secondary stored value account. One way in which this access may be limited is by creating the primary stored value account and secondary stored value account in separate account programs, thus severing any relationship between the two other than that the primary stored value account may be used to fund the secondary stored value account. Another way in which the limitations are implemented are through transaction rules that are stored, managed, and verified by the account processing application 128 of the transaction processing system 120 when respective account transaction requests are being processed. Accordingly, the transaction processing rules may be customizable to provide flexible and varying conditions, based upon the needs and requirements of entities associated with respective stored value accounts.

In one example embodiment, the secondary account holder 110 may transmit a request for account information 240 from the secondary client device 112 to the transaction processing system 120 via the network 102. For instance, this may be performed via a webpage by selecting a hyperlink, page link, page tab, button, completing a form, and the like. The transaction processing system 120 and associated account processing application 128 may preemptively limit access only to privileged information by restricting the webpage options delivered to the client device 112, such that only those accounts and only the associated types of information will be accessible to the secondary account holder 110, based at least in part on login information, for example. In another embodiment, however, if a request for information is transmitted, such as through a form, an email, and the like, the transaction processing system 120 and associated account processing application 128 may process the request for account information 240 against the transaction rules to determine whether the secondary account holder 110 has sufficient privileges to access the information requested. For example, the request for account information 240 may include secondary stored value account information, such as an account number or other identifier, a PIN or other authorization code, and the type of information requested, including the account with which the information is associated. A conventional look-up table, workflow and rules processing engine, or any other suitable techniques may be used by the account processing application 128 to perform transaction rules processing.

If it is determined that the secondary account holder 110 has proper authority to access the information requested, such as if requesting secondary stored value account information, the transaction processing system 120 will reply with an account information reply 242 over the network 102 to the secondary client device 112 for viewing by the secondary account holder. As stated before, this step may be implicit in embodiments limiting webpage access to only that information for which that user is authorized to access. If it is determined that the secondary account holder 110 does not have authority to access the information requested, such as if requesting primary stored value account information, then the transaction processor may reply with an access denied message, re-request login credentials, and the like.

In a similar manner, the primary account holder 104 may request account information from the transaction processing system 120 via the network 102 using the primary client device 106. The transaction processing system 120 and its associated account processing application 128 may process the request (or otherwise initially limit online access to information) against the transaction rules maintained by the transaction processing system 120, to limit access to only information for which the primary account holder 104 is authorized to view, such as only primary stored value account information.

In one example embodiment, the secondary account holder 110 may transmit a conversion request 250 to convert a secondary stored value account to a different type of account to the transaction processing system 120 via the network 102. For instance, if the secondary stored value account was created at the request of a primary account holder 104 having a stored value account with funding or other account limitations, that secondary stored value account may inherit the same or more restricted funding or other account limitations. In one embodiment, a secondary stored value account being of a first account type may not be funded by the secondary account holder 110 and may only be funded by the primary account holder 104, such as from the primary stored value account. Thus, in this instance, to permit funding of the secondary stored value account, the account can be converted to a second account type. The first and second account types (or any other number of account types) may be designated by rules or conditions associated with the account type, such as those set according to account program designations.

Upon conversion of the secondary stored value account from a first account type to a second account type, the secondary account holder 110 may then be permitted to request funding 252 of the secondary stored value account. The funding request 252 may be transmitted from the secondary client device 112 to the transaction processing system 120 via the network 102. When processing the funding request 252, the transaction processing system 120 and its associated account processing application 128 may process and transmit corresponding debits from a funding account or other monetary source and corresponding credit to the secondary stored value account. For instance, the secondary account holder 110 may indicate via the secondary client device 112 another financial account (e.g., a checking account, a credit account, another stored value account, etc.) that can be used to fund the secondary stored value account. In another example, the secondary account holder 110 may process a funding request at a merchant site 150, such as by paying cash or other form of payment to the merchant 150, and the merchant 150 may then process the funding request with the transaction processing system 120.

While the example data flow 200 has described the primary account holder 104 and the secondary account holder 110 issuing requests and receiving responses with the transaction processing system 120 from the primary client device 106 and the secondary client device 112, respectively, any of the above described transactions may also be performed via the primary telecommunications device 108 and the secondary telecommunications device 114 over a network 102, such as a telecommunications network. In one example, the primary or secondary telecommunications devices 108, 114 may access 260, 262 an IVRU hosted by or on behalf of the transaction processing system 120 that interfaces with the account processing application 128, allowing the users to request accounts, fund accounts, request account information, and the like. In another example, primary or secondary telecommunications devices 108, 114 may be used to communicate 260, 262 with a live customer service agent who then may use one or more applications to interface with the account processing application 128 for processing the same or similar transactions.

In addition, one or more of the above described transactions may be conducted at a merchant site 150, such as with a POS terminal. For example, as is conventionally performed with stored value cards (and other payment instruments), the primary account holder 104 or the secondary account holder 110 may present a stored value card associated with their respective stored value account for payment during a purchase transaction. The merchant 150 may then transmit the payment transaction 270, at least in part, through the transaction processing system 120 via the network 102. As part of processing the payment transaction 270, the account processing application 128 may confirm availability of funds, conduct user authorization, update account balances, and/or settle transactions with respective financial institutions 140, such as the merchant bank and card issuing bank. In another example, the primary account holder 104 or the secondary account holder 110 may process a funding request transaction 272 at a merchant site 150, such as by presenting cash or another payment instrument to the merchant 150. The funding request transaction 272 may be transmitted from the merchant 150 to the transaction processing system 120 via the network 102, for processing by the account processing application 128 as described above.

In example embodiments, some or all of the data transmitted between entities in the system, as described by the systems 100 and the data flow 200 illustrated in FIGS. 1 and 2, may be encrypted to increase security and maintain privacy of the information. The security of financial account information is paramount to avoid fraud, particularly when performing electronic payment transactions. Accordingly, one or more of the transmissions of account data and/or account holder data discussed herein may include additional security measures as is acceptable by the participating entities and under the governing laws and regulations. As described, certain data may be password protected, the systems may include administrative functions that include unique user identification for any person and/or entity operating and/or accessing the systems, that vary access to certain data based on user roles and responsibilities, and that can terminate user access to one or more of the systems. Additionally, certain data transmitted may be encrypted prior to transmission using acceptable encryption techniques, as are known (e.g., SSL encryption). Thus, the account processing application 128, as well as the client devices 106, 112, the telecommunications devices 108, 114, the employer systems 130, the financial institution systems 140, the merchant systems 150, and/or any other data processing, communication, and storage systems, as described herein that may be executed by one or more of the above described entities to transmit or receive data may include an encryption/decryption module and/or a user access administration module to satisfy the security and privacy of financial account information and account holder information.

One skilled in the art may recognize the applicability of embodiments of the invention to other environments, contexts, and applications. One will appreciate that components of the system 100 and data flow 200 shown in and described with respect to FIGS. 1 and 2 are provided by way of example only. Numerous other operating environments, system architectures, device configurations, and data flows are possible. Accordingly, embodiments of the invention should not be construed as being limited to any particular operating environment, system architecture, device configuration, or data flow.

FIG. 3 is a flowchart of one example method 300 for creating a secondary stored value account in accordance with various embodiments of the invention. The method 300 may include receiving a request to create a secondary stored value account, such as from a primary account holder, notifying the secondary account holder of the newly created account, and establishing transaction rules associated with the secondary stored value account. For example, a primary account holder can invite an acquaintance or family member to open a secondary stored value account and have available a stored value card having similar characteristics as the primary stored value account. Allowing primary account holders to invite others to participate in a stored value program not only creates benefits for the secondary account holders by having an alternative to conventional banking, but also provides an additional channel by which stored value account issuers and/or program managers/account processors can obtain additional customers and increase market penetration. Accordingly, the ease by which a secondary account holder may be enrolled can provide a viable means to attract more stored value account customers and thus additional revenue for the issuers.

The method 300 may begin at block 305. At block 305, a request to create at least one secondary stored value account for a recipient is received. The request may be received by a transaction processing system, for instance a system associated with a stored value account processor and/or account program manager, such as the transaction processing system 120 described with reference to FIGS. 1 and 2. In one embodiment, the request may be received from a primary account holder, such as the primary account holder 104 described with reference to FIGS. 1 and 2. As used herein, the terms "secondary account holder" and "recipient" are used interchangeably, and each refer to an individual for whom a secondary stored value account may be created, such as the secondary account holder 110 described with reference to FIGS. 1 and 2, according to embodiments of the invention.

In one embodiment, the request to create a secondary stored value account may be received over a network, such as the network 102 described with reference to FIGS. 1 and 2, and may have been generated by a primary account holder 104 using a client device, such as a personal computer, accessing a website for maintaining and accessing stored value account information and/or for generating transaction requests, such as funding requests and additional secondary account creation requests. For example, the website may present one or more links or otherwise make accessible one or more options to request or apply for a secondary stored value account for a recipient.

According to one example, when requesting a secondary stored value account, a form requesting information on the recipient may be presented to the primary account holder. Example information requested may include, but is not limited to, name, date of birth, social security number, street address, city, state, zip code, telephone number(s), email address, preferences, and/or special messages or requests. Thus, in this embodiment, the primary account holder provides most or all of the information required to create a secondary stored value account for a recipient, such that the recipient may only need to confirm the information, authorize his/her identity, agree to terms, and the like. After entry of the information, the primary account holder may then submit the request over the Internet or other network to the transaction processing system 120 for processing.

According to another example, a primary account holder may send an invite, such as an email invite, an automated message, a short messaging service ("SMS") message, or any other network-transmitted message, to the recipient, requesting the recipient to provide enrollment information for creating a secondary stored value account.

According to another example, the primary account holder may use a telecommunications device for communicating with an IVRU to enter some or all of the requested recipient information to create a secondary stored value account. The IVRU may be integrated with or otherwise communicate with the transaction processing system for processing the request. In another example, instead of or in addition to interacting with an IVRU, the primary account holder may communicate with a customer service representative using a telecommunications device, who then processes the request with the transaction processing system.

According to yet another example, the primary account holder may mail a paper-based request to create a secondary stored value account, whereby a customer service agent may then process the request with the transaction processing system.

As part of processing the request to create a secondary stored value account, the transaction processing system may include an account processing application, such as the account processing application 128 described with reference to FIGS. 1 and 2, to verify the request against transaction rules associated with the primary stored value account. For instance, the transaction rules may be checked to determine if the primary account holder and/or the primary stored value account are permitted to create a secondary stored value account. In example embodiments, limits may be placed on account holders or certain stored value accounts, such as a limit on the number of secondary stored value accounts permitted, a limit based on account history, a limit based on account balance, and the like. Various entities may be able to define and adjust the transaction rules, such as an employer providing the stored value account to a primary account holder, a financial institution issuing the primary and secondary stored value accounts, the account processor associated with the transaction processing system, a merchant sponsoring and/or distributing stored value accounts and associated stored value cards, the primary account holder, and/or any combination thereof.

Following block 305 is block 310, in which a secondary stored value account is created by the transaction processing system if permitted based at least in part on the transaction processing rules. The transaction processing system and its associated account processing application may create an association between the secondary stored value account and the primary stored value account. The association may be implemented by creating an additional record in a database defining the association, such as a cross-reference table including unique identifiers of each, by editing one or more records associated with the primary stored value account, by editing one or more records associated with the secondary stored value account, and/or by any other suitable means for defining and electronically maintaining an association between two records. Among other purposes, the association between the primary stored value account and the secondary stored value account may aid in processing the respective transaction rules, such as funding rules, access rules, and the like.

In one embodiment, the secondary stored value account may be created to inherit the substantially same or similar properties as the primary stored value account with which it is associated, although associated with distinct account programs to create sufficient independence and distinction between the primary and secondary stored value accounts. For instance, although associated with separate account programs, the secondary stored value account and the primary stored value account may be of the same account type, may have the same or similar limits, restrictions, and properties, such as spending limits, funding limits, funding mechanisms, or spending locations, may have the same or similar access to information and functionality provided by the transaction processing system and/or the card issuer, and others. However, in some embodiments, the secondary stored value account may have additional or different limits, restrictions, and properties as the primary stored value account. For instance, in one embodiment, if the primary stored value account is a pooled account, such as an employer funded account, the secondary stored value account may be funded by the primary account holder, but not the primary account holder's employer, or in another embodiment, the secondary account holder may not be permitted to fund the secondary stored value account if still the same account type as the primary (e.g., pooled account). The limits, restrictions, and properties placed on the primary and/or secondary stored value account may also be determined, at least in part, based upon the account program with which it is associated. Accordingly, in one example embodiment, limits, restrictions, and properties for each of the stored value accounts may be determined at the program level, inherited from the primary stored value account, by any associated party, such as an employer, an issuer, the account processor associated with the transaction processing system, a merchant, the primary account holder, and/or any combination thereof.

In one embodiment, the secondary stored value account may not be activated until the secondary account holder recipient activates the account. Though, in other embodiments, the secondary stored value account may be immediately active upon creation, such that, if the account is funded, the secondary account holder may immediately use the account and/or associated stored value card upon notification or receipt.

Following block 310 is block 315, in which a notification of the creation of the secondary stored value account is transmitted. The notification may be transmitted to the secondary account holder and/or to the primary account holder. In other embodiments, a notification may be sent to a third party, such as to an employer associated with the primary stored value account, to an issuer, and the like.

In one embodiment, the notification may be transmitted over a network via an email to the secondary account holder and/or the primary account holder. In other embodiments, the notification may be transmitted as an automated message, such as may be communicated over a telecommunications device, an SMS message, or any other network-transmitted message.

According to one embodiment, a notification message transmitted to the secondary account holder recipient may simply include information about the secondary stored value account, such as an account number, terms and conditions, limits, restrictions, and other associated properties. In another embodiment, the notification message transmitted may further include information to authorize the identity of the secondary account holder as the intended recipient of the account. For example, the authorization information may include an invitation code generated by the primary account holder or the transaction processing system during the request and/or account creation steps, and/or the birth date of the primary account holder (e.g., assumed to be known by the secondary account holder). In other embodiments, the notification may request additional information about the secondary account holder and/or request that the secondary account holder agree to account terms and conditions. Acceptance, providing additional information, and/or any other suitable message in response may be used by the transaction processing application to activate the secondary stored value account.

According to one embodiment, a response to the notification may be transmitted over the Internet, such as when accessing a form on a website or replying to an email. In other embodiments, a response to the notification may be transmitted via a telecommunications device interacting with an IVRU, via a telecommunications device interacting with a customer service agent, or by any other suitable means.

Following block 315 is block 320, in which transaction rules may be established for the secondary stored value account. As described above, rules, limits, restrictions, and properties for each of the stored value accounts may be determined at the program level, inherited from the primary stored value account, by any associated party, such as an employer, an issuer, the account processor associated with the transaction processing system, a merchant, the primary account holder, and/or any combination thereof. The transaction processing system and its associated account processing application may manage transaction rules, implementing any or all of the respective limits, restrictions, and/or properties associated with the secondary stored value account and/or the primary stored value account. According to one embodiment, the transaction rules may be stored as one or more entries in one or more databases, associated with the respective stored value account, defining the properties or restrictions, which may be accessed by the account transaction application when processing stored value account transactions. According to other embodiments, the transaction rules may be implemented at least in part using a workflow and rules processing engine, or any other suitable techniques, In one embodiment, the transaction rules may include funding rules, which may limit or otherwise prescribe who and how funding may occur for respective stored value accounts. For instance, in one embodiment the funding rules limit funding of the secondary stored value account to occur from the primary account holder and/or from the primary stored value account. In another embodiment, the funding rules may be adjusted if the secondary stored value account is converted to a different account type or if the rules are otherwise adjusted, whereby the secondary account holder may fund the secondary stored value account.

In one embodiment, the transaction rules may include access rules, which may limit or otherwise prescribe who can access account information associated with respective stored value accounts. For instance, in one embodiment, the access rules may prevent the primary account holder from accessing some or all of the account information associated with the secondary stored value account. Likewise, the access rules may prevent the secondary account holder from accessing some or all of the account information associated with the primary stored value account.

Following block 320 is block 325, in which the secondary stored value account may optionally be activated. As described above, in one embodiment, the secondary stored value account may not be activated until additional information and/or authorization is obtained from the secondary account holder. Accordingly, upon receiving one or more responses to a notification transmitted, such as is described with reference to block 315, the transaction processing system and its associated account processing application may then activate the secondary stored value account. In one embodiment, the transaction processing system and its associated account processing application may first review and/or verify information received in the response to the notification, such as verifying authorization information transmitted by the secondary account holder, or receiving an indication that the secondary account holder assents to associated terms and conditions. In another embodiment, such as the embodiment in which the secondary account holder provides personal information in the response to the notification, the transaction processing system and its associated account processing application may update the secondary stored value account information already created (or, in one embodiment, create it at this step), as well as activate the secondary stored value account.

However, in other embodiments in which the account is activated upon creation, such as at block 310, block 325 may not be performed.

Following block 325 is block 330, in which the secondary stored value account is optionally funded. According to the transaction rules, such as is described above, there may be limitations on who is permitted to fund one or more of the stored value accounts and/or from which account funding may be transferred. For instance, in an embodiment in which the primary account holder is permitted to fund the secondary stored value account, the primary account holder may transmit a funding request for a given amount. The funding request may be transmitted to the transaction processing system 120, such as via a website or other network-based message, or via a telecommunications device communicating with an IVRU or a customer service agent. The account processing application at the transaction processing system 120 may process the funding request, such as by reviewing the information, verifying the request information against the funding rules, and performing the corresponding debits and credits between the respective stored value accounts. For example, when processing a funding request for a secondary stored value account, the account processing application may perform, but is not limited to one or more of the following example steps: verify the requester against the funding rules, such as to determine if the requestor is associated with an account permitted to fund the secondary stored value account; verify the status of the primary stored value account, such as whether it is active or has been inactivated; verify the status of the secondary stored value account, such as whether it is active or has been inactivated; verify the funding amount, such as whether the account from which the funds are to be transferred has a sufficient balance at least equal to or greater than the funding amount; verify the transaction fee amount, such as whether the account from which the funds are to be transferred has a sufficient balance at least equal to or greater than the transaction fee in addition to the funding amount (if a transaction fee is incurred); verify the funding amount against the funding rules, such as funding maximums, funding minimums, and funding frequencies; verify any recurring requests against a calendar or other date/time look-up function; and/or confirm the funding request with the requestor.

In addition, in one embodiment, if the funding request satisfies the funding rules and/or any other transaction rules, the account processing application 128 may aid in settling the funding request by debiting the balance of the account from which the funds are to be transferred and crediting the funded stored value account. For instance, when funding the secondary stored value account from the primary stored value account, the transaction processing application may debit the primary stored value account balance by at least the funding amount (and optionally by an additional funding transaction fee), and credit the secondary stored value account balance by the funding amount. In one example, in which the primary and secondary stored value accounts are associated with a pooled fund, such as when funded by an employer, the settlement may be performed internally within the transaction processing system, whereby adjusting the account balances effectively performs the settlement. In another embodiment, however, some or all of the settlement processing may be done over a network with one or more financial institutions, such as over a banking network processing ACH transactions between the issuing financial institutions associated with the respective stored value accounts.

The method 300 may end following block 330, having processed a request to create at least one secondary stored value account.

FIG. 4 is a flowchart of one example method 400 for funding a secondary stored value account, according to one embodiment of the invention.

The method 400 may begin at block 405, where a primary stored value account may be funded. According to one embodiment in which the primary stored value account is an employer funded account, such as a payroll stored value account, an employer, such as an employer 130 of a primary account holder 104 as described with reference to FIGS. 1 and 2, may fund the account by transmitting funding transactions (e.g., similar to a payroll direct deposit over the ACH) to a transaction processing system, such as the transaction processing system 120 described with reference to FIGS. 1 and 2.

In other embodiments, other parties or entities may fund the primary stored value account. For instance, the primary account holder may fund the primary stored value account instead of, or in addition to, an employer. The primary account holder may fund the primary stored value account at a merchant's POS terminal, such as the merchant site 150 as described with reference to FIGS. 1 and 2, by providing cash or another payment instrument to the merchant. Settlement then occurs between the stored value account issuing financial institution and the merchant. In another example, the primary account holder may fund the primary stored value account over an IVRU or in communication with a customer service agent, using another payment instrument, such as a credit account, debit account, or another stored value account. In yet another example, the primary account holder may fund the primary stored value account using an online web application, such as is hosted by or on behalf of the transaction processing system, using another payment instrument.

Following block 405 is block 410, in which a request is transmitted to the transaction processor to fund the secondary stored value account. The transaction processing system may determine whether the funding is permitted prior to funding the account, such as is described with reference to block 330 of FIG. 3. The funding request may be submitted to the transaction processing system via an online web application, via email, using a telecommunications device with an IVRU, using a telecommunications device with a customer service agent, via mail, or by any other suitable means for communicating with the transaction processing system.

Following block 410 is decision block 415, illustrating at least one example of verification performed by the transaction processing system prior to funding. The transaction processor and an associated account processing application, such as the account processing application 128 described with reference to FIGS. 1 and 2, may process the funding request against transaction rules and funding rules associated with the secondary stored value account. In this example embodiment, the transaction processing system and its associated account processing application may determine whether the party requesting to fund the account is permitted to fund the account. As described above, these funding rules may vary based on account type, account program, and/or may be adjusted by an individual or entity. In one example embodiment, the primary account holder may be the only party permitted to fund the secondary stored value account, unless the secondary stored value account has been convened to a different account type or the funding rules are otherwise adjusted.

Accordingly, in this example embodiment, at decision block 415, the transaction processing system and its associated account processing application can determine if it is the primary account holder that transmitted the funding request and/or whether the funds are requested to be drawn from the primary stored value account associated with the primary account holder. The account processing application 128 may process the funding request against the transaction rules, the funding rules, an association generated and stored between the primary stored value account and the secondary stored value account, or any other rules, limits, and restrictions.

If it is determined at decision block 415 that the funding request is not from the primary account holder and/or the funds are not being requested to be drawn from the primary stored value account (e.g., from the secondary account holder instead of the primary account holder), then block 420 follows. At block 420, the transaction processing system and its associated account processing application may refuse the funding request and prevent funding the secondary stored value account if the transaction rules verification processing fails at decision block 415. In one example embodiment, the transaction processing system may transmit to the requester (e.g., the secondary account holder), a failure status message and/or reasoning why the funding request was refused. In another example, the transaction processing system may transmit an option to the secondary account holder to connect the account to a different account type that permits funding, such as a demand deposit account.

Decision block 415 and block 420 illustrate only one example embodiment of processing a funding request against transaction and funding rules maintained by the transaction processing system. Any other rules or limitations may be stored in the transaction processing system and verified by steps similar to that described with reference to decision block 415 and block 420.

If however, it is determined at decision block 415 that the funding request is from the primary account holder (and/or other transaction and funding rules are satisfied), then decision block 425 follows. At decision block 425 it is determined what type of funding request is submitted. For example, the funding request may be an immediate funding request, whereby the funds are transferred and the balance is increased in a relatively short period of time (i.e., real time or near real time), or the funding request may be a scheduled request to occur at a prescribed date and/or time or a recurring funding request, whereby fund transfers recur at multiple prescribed dates and/or times. Decision block 425 illustrates only one example embodiment, and other funding request types may also be determined.

If it is determined at decision block 425 that the finding request is to immediately fund the secondary stored value account, blocks 430-445 follow. At block 430, the transaction processing system 120 and its associated account processing application may receive, or otherwise determine from the request, the funding amount which is to be credited to the secondary stored value account, Following block 430 is block 435, in which the transaction processing system and its associated account processing application may perform additional transaction rules processing, such as rules prescribed for immediate funding. As one example, having received the funding amount, the account processing application and associated transaction rules may determine whether or not the primary stored value account has sufficient funds from which the funding amount and optionally a transaction fee could be debited. In another example, other restrictions, such as funding maximums or minimums or frequency limitations, may be verified.

Following block 435 is block 440, in which the account processing application may settle the funding request by debiting from the primary stored value account the funding amount and crediting the funding amount to the secondary stored value account. As part of the settlement, the account balances are updated, any adjustments as may be required with issuing financial accounts may be made, and the primary and/or secondary account holders may be notified or otherwise be given access to the updated account balances and/or funding transaction information.

Following block 440 is block 445, in which an optional transaction fee may be debited from one account. In one example, the primary stored value account, from which the funds are drawn, may also be charged a transaction fee. In another example, the secondary stored value account may be charged a transaction fee, instead of or in addition to, the primary stored value account. Transaction fees are optional, and may be structured in many ways, such as a one time fee, a recurring fee, a per-transaction fee, and the like.

If, however, it is determined at decision block 425 that the funding request is for a scheduled or recurring request, for example, blocks 450-465 follow. At block 450 the funding terms are received or otherwise determined by the transaction processing system. The funding terms may include, but are not limited to, a funding amount, funding schedule, such as date or dates, time or times, recurring frequency, and the like.

Following block 450 is block 455, in which the transaction processing system 120 and its associated account processing application may perform additional transaction rules processing, such as rules prescribed for scheduled or recurring finding, in addition to those that may be applicable to any funding requests, as further described by the example herein. As one example, the account processing application and associated transaction rules may determine whether or not the primary stored value account has sufficient finds from which the funding amount or amounts and optionally a transaction fee or fees could be debited. In another example, other restrictions, such as funding maximums or minimums or frequency limitations, may be verified for the total number of scheduled or recurring funding requests to be processed over a given time.

Following block 455 is block 460, in which the account processing application may settle the funding request at the scheduled time or times by debiting from the primary stored value account the funding amount and crediting the funding amount to the secondary stored value account, in substantially the same or similar manner as is described with reference to block 440.

Following block 460 is block 465, in which an optional transaction fee or fees may be debited from one account for each funding request in substantially the same or similar manner as is described with reference to block 445.

Although the example method 400 describes funding from a primary stored value account to one secondary stored value account, in example embodiments, the primary account holder and primary stored value account may be used to fund multiple secondary stored value accounts associated with the primary stored value account, according to the respective transaction and funding rules.

In addition, the transaction and funding rules may provide for different funding restrictions than what is described by example herein.

The method 400 may end after blocks 420, 445, or 465, either refusing a funding request or having funded one or more secondary accounts by immediate, scheduled, or recurring fund transactions.

FIG. 5 is a flowchart of one example method 500 for controlling access to one or more stored value accounts, according to one embodiment of the invention. The example method 500 illustrates only one example embodiment of restricting access—limiting access to a secondary stored value account by a primary account holder. However, other limits may be enforced by a transaction processing system and an associated account processing application, such as the transaction processing system 120 and account processing application 128 described with reference to FIGS. 1 and 2. Additional and/or different limits may be provided by transaction rules and access rules associated with the primary stored value account and/or the secondary stored value account, which can be processed and enforced by the account processing application.

The method 500 may begin at block 505, in which a request is transmitted to the transaction processor to access account information associated with the secondary stored value account. The account information request may be submitted to the transaction processing system via an online web application, via email, using a telecommunications device with an IVRU, using a telecommunications device with a customer service agent, via mail, or by any other suitable means for communicating with the transaction processing system.

Following block 505 is decision block 510, illustrating at least one example of verification performed by the transaction processing system prior to permitting access and transmitting the requested account information. The transaction processor and an associated account processing application may process the account information request against transaction rules and access rules associated with the secondary stored value account. In this example embodiment, the transaction processing system and its associated account processing application may determine whether the party requesting to access the account information is permitted to do so. As described above, account information access rules may vary based on account type, account program, and/or may be adjusted by an individual or entity. In one example embodiment, the primary account holder is not permitted to access any account information associated with the secondary stored value account, regardless of whether the primary account holder invited or otherwise caused the secondary stored value account to be created. In other embodiments, however, the primary account holder may be restricted from only a portion of the secondary stored value account information, and/or parties other than the primary account holder may be similarly restricted. Similarly, the secondary account holder may likewise be restricted from accessing some or all of the account information associated with the primary stored value account in substantially the same or similar manner as is described in this example.

Accordingly, in this example embodiment, at decision block 510, the transaction processing system and its associated account processing application can determine if it is the secondary account holder that transmitted the account information request. The account processing system may process the account information request against the transaction rules, access rules, or any other rules, limits, and restrictions.

If it is determined at decision block 510 that the account information request is not from the secondary account holder (e.g., from the primary account holder instead of the secondary account holder), then block 515 follows. At block 515, the transaction processing system and its associated account processing application may prevent access to the account information associated with the secondary stored value account and thus not transmit the information to the requester if the transaction rules verification processing fails at decision block 510. In one example embodiment, the transaction processing system may transmit to the requestor (e.g., the primary account holder), a failure status message and/or reasoning why the account information request was refused.

Decision block 510 and block 515 illustrate only one example embodiment of processing an account information request against transaction and access rules maintained by the transaction processing system. Any other rules or limitations may be stored in the transaction processing system and verified by steps similar to that described with reference to decision block 510 and block 515.

If, however, it is determined at decision block 510 that the account information request is from the secondary account holder, then block 520 follows, in which the requested account information is transmitted to the secondary account holder. The requested account information may be transmitted to the secondary account holder via an online web application, via email, using an IVRU to transmit a pre-recorded or automatically generated message, queuing a live telephone call from a customer service agent, via mail, or by any other suitable means for communicating with the secondary account holder.

The method 500 may end after blocks 515 or 520, either refusing an account information request or having transmitted the requested account information.

FIG. 6 is a flowchart of one example method 600 for processing a request to convert a secondary stored value account to a different account type than that under which it was originally created. As described above, additional benefits (or different limitations) may be conferred on a secondary account holder, such as the secondary account holder 110 described with reference to FIGS. 1 and 2, if the secondary stored value account is converted to a different account type. In one example, a secondary stored value account may be created as an account in a pooled account program, such as when created by a primary account holder having an employer funded primary stored value account, such as the primary account holder 104 and employer 130 described with reference to FIGS. 1 and 2. Thus, converting the secondary stored value account to a different account type, for example, a demand deposit account, may permit the secondary account holder to have greater options and flexibility, such as funding permissions.

The method 600 may begin at block 605, in which a request is transmitted to the transaction processing system, such as the transaction processing system 120 described with reference to FIGS. 1 and 2, to convert a secondary stored value account that was created under a first account type to a second account type. For example, a secondary account holder may desire to convert to the second account type because of the different transaction rules associated with the new account type. In one example, the different account type may be a demand deposit account, which permits the secondary account holder to fund the secondary stored value account. In other embodiments, other transaction rules, such as any of those described by example herein or that may otherwise be prescribed, may be adjusted. The conversion request may be submitted to the transaction processing system via an online web application, via email, using a telecommunications device with an IVRU, using a telecommunications device with a customer service agent, via mail, or by any other suitable means for communicating with the transaction processing system.

Following block 605 is block 610, in which the transaction processing system and an associated account processing application, such as the account processing application 128 described with reference to FIGS. 1 and 2, may convert the secondary stored value account to the second account type requested by the secondary account holder. According to one embodiment, when performing this conversion, the association originally generated and stored between the primary stored value account and the secondary stored value account may be maintained, notwithstanding the conversion to the second account type. The account processing application may cause the conversion by altering an association between the secondary stored value account and the original account type to the second account type requested, such as in one or more database records.

Following block 610 is block 615, in which the transaction rules associated with the secondary stored value account may be adjusted based on the new second account type requested. For example, as illustrated at block 615, in one example the new account type can permit the secondary account holder to fund the secondary stored value account. Other transaction rules, limits, restrictions, and/or properties may be adjusted as a result of this conversion. Moreover, in one example embodiment, the transaction rules may be automatically or partially automatically adjusted, simply by converting the account type, such as when the transaction rules are associated to accounts by virtue of the account type. In other embodiments, however, some or all of the transaction rules may be adjusted as an additional step, such as if the transaction rules are tied with an account program or with each individual account.

Following block 615 is block 620, in which the primary account holder optionally may continue to be permitted to fund the secondary stored value account, even after being converted to a new account type. However, in other embodiments, transaction and funding rules may restrict the primary account holder, or other parties, from funding the secondary stored value account after conversion.

In one embodiment, the secondary account holder may receive a new card number, a new stored value card, or any combination thereof, as a result of converting to the new account type. However, in other embodiments, the same account, card number and stored value card may be maintained and used, even after conversion.

The method 600 may end after block 620, having processed a request to convert the secondary stored value account from a first account type to a second account type.

The above example methods are described and illustrated in a request and response style, such as receiving a request to process a transaction or a request for information and generating an appropriate response thereto. However, in other example embodiments, substantially the same or similar methods may be implemented to preemptively limit the options available to an end user, such as when using an online application. For instance, a primary or secondary account holder may only have presented to them options to process transactions or options to access information for which they are permitted to process or access. For example, a website hosted by or on behalf of the transaction processing system may limit the links to information or only present webpages to a user based on transaction, funding, and/or access rules processed by the account processing application in a manner similar to those described for the above example methods.

Accordingly, example embodiments of the invention can provide the technical effects of creating a system and method that provides an additional method for acquiring new stored value account customers by providing a unique means for allowing an existing stored value account to invite or otherwise create a secondary stored value account for another individual. Example embodiments of the invention can provide the further technical effects of providing systems and methods for processing transactions and requests unique to primary and associated secondary stored value accounts, including providing transaction rules and associated functionality for controlling the creation, funding, and access of primary and secondary stored value accounts, as well as the conversion to different account types.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

In certain embodiments, performing the specified functions, elements or steps can transform an article into another state or thing. For instance, example embodiments of the invention can provide certain systems and methods that transform stored value account creation requests to actual stored value accounts for secondary cardholders, which can be used to fund subsequent transactions, such as purchase, withdraw, and the like. Example embodiments of the invention can provide further systems and methods that transform account information requests to actual account information, such as one or more displays, printouts, reports, or messages providing requested information transformed from account information requests and associated account data.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method for establishing a secondary stored value account associated with a primary stored value account, comprising executing computer program instructions by one or more processors for:
   in response to receiving a request to create a secondary stored value account for a recipient, creating the secondary stored value account for the recipient;
   establishing an association between a primary stored value account and the secondary stored value account;
   modifying at least one transaction rule associated with the primary stored value account, wherein the at least one transaction rule prevents access to account information associated with the secondary stored value account by a primary account holder associated with the primary stored value account;
   establishing transaction rules associated with the secondary stored value account, wherein the transaction rules are either predetermined before or determined after creation of the secondary stored valued account, wherein the transaction rules comprise:
      funding rules limiting funding of the secondary stored value account to occur from the primary stored value account; and
      access rules preventing access to account information associated with the primary stored value account by a secondary account holder associated with the secondary stored value account; and
   in response to receiving, from the recipient, a request to convert the secondary stored value account to a new account type, convert the secondary stored value account to the new account type by altering the association between the secondary stored value account and the primary stored value account, wherein the new account type comprises at least one transaction rule different from the transaction rules associated with the secondary stored value account.

2. The method of claim 1, wherein the request to create the secondary stored value account for the recipient further is received from or on behalf of the primary account holder.

3. The method of claim 1, further comprising receiving information associated with the recipient from the primary account holder.

4. The method of claim 1, further comprising:
   transmitting, to the recipient, an invitation in response to receiving the request to create the secondary stored value account; and
   receiving a response to the invitation from the recipient comprising information associated with the recipient to facilitate creating the secondary stored value account.

5. The method of claim 3, further comprising receiving authentication information to facilitate authenticating the recipient.

6. The method of claim 1, wherein the primary stored value account comprises an employer-funded account.

7. The method of claim 1, further comprising:
   receiving, from the primary account holder, a request to fund the secondary stored value account with funds from the primary stored value account, the request indicating a fund amount;
   determining that the primary account holder is permitted to fund the secondary stored value account based at least in part on the funding rules; and
   debiting the fund amount from the primary stored value account and crediting the fund amount to the secondary stored value account in response to determining that the primary account holder is permitted to fund the secondary stored value account.

8. The method of claim 1, further comprising:
   receiving, from the recipient, a request to fund the secondary stored value account; and
   preventing funding of the secondary stored value account by the recipient based at least in part on the funding rules.

9. The method of claim 1, further comprising, after creating the secondary stored value account, converting the secondary stored value account from a first account type to a second account type, in response to a request from the recipient to convert the secondary stored value account.

10. The method of claim 9, further comprising adjusting the funding rules to permit the recipient to fund the secondary stored value account.

11. The method of claim 1, wherein the primary stored value account is associated with a first account program, and further comprising associating the secondary stored value account with a second account program.

12. The method of claim 1, further comprising assigning an account number to the secondary stored value account that is distinct from an account number assigned to the primary stored value account.

13. The method of claim 1, further comprising issuing a stored value card associated with the secondary stored value account comprising a card number that is distinct from a card number associated with the primary stored value account.

14. The method of claim 1, wherein the secondary stored value account comprises a first secondary stored value account associated with a first recipient, and further comprising:
   in response to receiving a request to create a second secondary stored value account for a second recipient, creating the second secondary stored value account for the second recipient;
   establishing an association between the primary stored value account and the second secondary stored value account; and
   establishing transaction rules associated with the second secondary stored value account, wherein the transaction rules comprise:
      funding rules limiting funding of the second secondary stored value account to occur from the primary stored value account; and
      access rules preventing access to account information associated with the second secondary stored value account by the primary account holder.

15. The method of claim 1, wherein the at least one processor comprises a plurality of processors.

16. A system for processing stored value account transactions, comprising:
   a communications interface operable to connect with a network;
   a memory comprising instructions to process stored value account transactions;
   at least one processor in communication with the memory and the communications interface, and operable to execute the instructions to:
      create the secondary stored value account for the recipient in response to receiving, via the communications interface, a request to create a secondary stored value account for a recipient;
      store in the memory an association between a primary stored value account and the secondary stored value account;
      modify at least one transaction rule associated with the primary stored value account, wherein the at least one transaction rule prevents access to account information associated with the secondary stored value account by a primary account holder associated with the primary stored value account;
      establish transaction rules associated with the secondary stored value account, wherein the transaction rules are either predetermined before or determined after creation of the secondary stored valued account, wherein the transaction rules:
         limit funding of the secondary stored value account to occur from the primary stored value account;
         prevent access to account information associated with the primary stored value account by a secondary account holder associated with the secondary stored value account; and
         in response to receiving, from the recipient, a request to convert the secondary stored value account to a new account type, convert the secondary stored value account to the new account type by altering the association between the secondary stored value account and the primary stored value account, wherein the new account type comprises at least one transaction rule different from the transaction rules associated with the secondary stored value account.

17. The system of claim 16, wherein the at least one processor is further operable to receive the request to create the secondary stored value account from the primary account holder.

18. The system of claim 16, wherein the at least one processor is further operable to execute the instructions to receive, via the communications interface from the primary account holder, information associated with the recipient.

19. The system of claim 16, wherein the at least one processor is further operable to execute the instructions to:
transmit, via the communications interface to the recipient, an invitation in response to receiving the request from the primary account holder; and
receive, via the communications interface from the recipient, a response to the invitation comprising information associated with the recipient to facilitate creating the secondary stored value account.

20. The system of claim 16, wherein the primary stored value account comprises an employer-funded account.

21. The system of claim 16, wherein the at least one processor is further operable to execute the instructions to:
receive, via the communications interface from the primary account holder, a request to fund the secondary stored value account with funds from the primary stored value account, the request indicating a fund amount;
determine that the primary account holder is permitted to fund the secondary stored value account; and
debit the fund amount from the primary stored value account and credit the fund amount to the secondary stored value account in response to determining that the primary account holder is permitted to fund the secondary stored value account.

22. The system of claim 16, wherein the at least one processor is further operable to execute the instructions to create at least one additional secondary stored value account associated with the primary stored value account.

23. The system of claim 16, wherein the at least one processor is further operable to execute the instructions to convert the secondary stored value account to a demand deposit account in response to a request from the recipient.

24. The system of claim 23, wherein the at least one processor is further operable to execute the instructions to permit the recipient to fund the secondary stored value account after conversion to a demand deposit account.

25. The system of claim 16, wherein the primary stored value account is associated with a first account program and the secondary stored value account is associated with a second account program.

26. A method for facilitating stored value account transactions, comprising executing computer program instructions by one or more processors for:
receiving, from a third party, instructions to deposit a first value to a primary stored value account;
depositing the first value to the primary stored value account;
creating a secondary stored value account, wherein the secondary stored value account is associated in the transaction processing system to the primary stored value account;
modifying at least one transaction rule associated with the primary stored value account, wherein the at least one transaction rule prevents access to account information associated with the secondary stored value account by a primary account holder associated with the primary stored value account;
funding the secondary stored value account by debiting a second value from the primary stored value account and crediting the second value to the secondary stored value account, wherein funding of the secondary stored value account from the primary stored value account is permitted;
transmitting, to a secondary account holder associated with the secondary stored value account, account information associated with the secondary stored value account;
modifying a transaction rule associated with the secondary stored value account to prevent access to account information associated with the primary stored value account by the secondary account holder associated with the secondary stored value account; and
in response to receiving, from another third party, a request to convert the secondary stored value account to a new account type, converting the secondary stored value account to the new account type by altering the association between the secondary stored value account and the primary stored value account, wherein the new account type comprises at least one transaction rule different from transaction rules associated with the secondary stored value account.

27. The method of claim 26, further comprising:
receiving, from the primary account holder, a request to fund the secondary stored value account;
determining that the primary account holder is permitted to fund the secondary stored value account based at least in part on the transaction rules; and
funding the secondary stored value account based on the determination.

28. The method of claim 26, further comprising:
receiving, from the secondary account holder, a request to fund the secondary stored value account;
determining that the secondary account holder is not permitted to fund the secondary stored value account based at least in part on the transaction rules; and
preventing funding of the secondary stored value account based on the determination.

29. The method of claim 26, further comprising:
receiving, from the primary account holder, a request to access account information associated with the secondary stored value account;
determining that the primary account holder is not permitted to access account information associated with the secondary stored value account; and
not transmitting account information to the primary account holder based on the determination.

30. The method of claim 26, further comprising:
receiving, from the secondary account holder, a request to access account information associated with the secondary stored value account;
determining that the secondary account holder is permitted to access account information associated with the secondary stored value account; and
transmitting, to the secondary account holder, account information based on the determination.

* * * * *

UNITED STATES PATENT AND TRADEMARK OFFICE
CERTIFICATE OF CORRECTION

| | | |
|---|---|---|
| PATENT NO. | : 8,762,275 B2 | Page 1 of 1 |
| APPLICATION NO. | : 12/424089 | |
| DATED | : June 24, 2014 | |
| INVENTOR(S) | : Martino et al. | |

It is certified that error appears in the above-identified patent and that said Letters Patent is hereby corrected as shown below:

In the Specification

Column 3, line 10, delete "limiting finding" and insert --limiting funding--

Column 15, line 22, delete "know account" and insert --known account--

Signed and Sealed this
Eleventh Day of November, 2014

Michelle K. Lee
*Deputy Director of the United States Patent and Trademark Office*